US008814642B2

(12) United States Patent
Boi

(10) Patent No.: US 8,814,642 B2
(45) Date of Patent: Aug. 26, 2014

(54) GAMES APPARATUS

(75) Inventor: Marco Boi, London (GB)

(73) Assignee: Playinnovation Limited, London (GB)

( * ) Notice: Subject to any disclaimer, the term of this patent is extended or adjusted under 35 U.S.C. 154(b) by 0 days.

(21) Appl. No.: 13/813,807

(22) PCT Filed: Aug. 4, 2011

(86) PCT No.: PCT/GB2011/051482
§ 371 (c)(1),
(2), (4) Date: Feb. 1, 2013

(87) PCT Pub. No.: WO2012/017249
PCT Pub. Date: Feb. 9, 2012

(65) Prior Publication Data
US 2013/0130759 A1    May 23, 2013

(30) Foreign Application Priority Data

Aug. 5, 2010  (GB) .................................. 1013217.3

(51) Int. Cl.
*A63F 9/24* (2006.01)
*A63F 13/00* (2014.01)
*A63B 67/00* (2006.01)
*A63B 71/02* (2006.01)
*A63B 69/00* (2006.01)
*A63B 71/06* (2006.01)
*A63B 63/00* (2006.01)

(52) U.S. Cl.
CPC ............... *A63B 67/00* (2013.01); *A63F 13/005* (2013.01); *A63B 2210/50* (2013.01); *A63B 69/0053* (2013.01); *A63B 69/0097* (2013.01); *A63B 2071/0694* (2013.01); *A63B 2071/0633* (2013.01); *A63B 67/002* (2013.01); *A63B 71/02* (2013.01); *A63B 63/00* (2013.01); *A63B 71/0672* (2013.01); *A63B 71/0616* (2013.01); *A63B 71/022* (2013.01); *A63B 2207/02* (2013.01); *A63B 71/0622* (2013.01)
USPC ................... 463/2; 463/7; 273/348; 273/371; 273/390; 273/406

(58) Field of Classification Search
CPC .... A63F 13/005; A63B 67/002; A63B 63/06; A63B 63/00; A63B 69/002; A63B 63/004; A63B 69/0097; A63B 2024/004
USPC ............... 463/2, 7; 273/317–318, 317.1, 348, 273/389, 390, 406, 371–372, 386
See application file for complete search history.

(56) References Cited

U.S. PATENT DOCUMENTS 3,231,278 A    1/1966  Bonlanger
3,554,550 A *  1/1971  Schram ......................... 273/388

(Continued)

FOREIGN PATENT DOCUMENTS

GB         2 255022 A    10/1992

OTHER PUBLICATIONS

European Patent Office International Search Report and Written Opinion of the International Searching Authority mailed Dec. 1, 2011 in reference to co-pending application number PCT/GB2011/051482 filed Aug. 4, 2011.

*Primary Examiner* — William Brewster
*Assistant Examiner* — Alex F. R. P. Rada, II
(74) *Attorney, Agent, or Firm* — Dinsmore & Shohl, LLP

(57) ABSTRACT

Ball games apparatus for use by two or more players, comprises a playing wall with a plurality of targets arranged across at least one face of said playing wall, each target having a particular value associated therewith. In use, a player aims by kicking or throwing a ball or the like at the playing wall and scores points to the value of the target that is struck. The targets may correspond to balls of a conventional pool or snooker game, providing a similar scoring system to the table-based game but at the same time encouraging participation in physical activity. Added complexity is provided by means of ground markers randomly selected to denote which of a series of positions relative to the playing wall from which a player takes aim.

14 Claims, 7 Drawing Sheets

(56) References Cited

U.S. PATENT DOCUMENTS

| | | | |
|---|---|---|---|
| 3,806,122 A * | 4/1974 | Jones | 273/331 |
| 5,664,782 A * | 9/1997 | Lacks et al. | 273/317.5 |
| 6,926,624 B1 | 8/2005 | Witzke | |
| 8,192,261 B2 * | 6/2012 | Yang | 463/3 |
| 2003/0030218 A1 * | 2/2003 | Zucchi et al. | 273/371 |
| 2004/0162166 A1 * | 8/2004 | Tien | 473/454 |
| 2008/0032826 A1 * | 2/2008 | Mubarak et al. | 473/446 |
| 2010/0304809 A1 * | 12/2010 | Yang | 463/4 |
| 2011/0190039 A1 * | 8/2011 | Kao | 463/7 |
| 2012/0302301 A1 * | 11/2012 | Homsi | 463/2 |

* cited by examiner

GAMES APPARATUS

CROSS REFERENCE TO RELATED APPLICATIONS

This application is a National-Phase Application under 35 U.S.C. §371 based on International Application No. PCT/GB2011/051482, filed Aug. 4, 2011, which International Application designates the United States and claims priority to Great Britain Patent Application No. 1013217.3, filed Aug. 5, 2010.

The invention relates to games apparatus of the type that includes a playing wall against which a ball or the like is aimed, and a method of playing a game.

Such playing walls do exist, but offer very limited play value or added educational benefits to children and adults. Other traditional indoor games, such as table games like snooker or pool, or darts, where the scoring encourages mental arithmetic skills offer little by way of physical exercise.

An object of this invention is to provide games equipment enabling physical exercise combined with mental stimulation for any number of players, either in teams or as individuals. A further object of the invention is to provide games equipment that is suitable for outdoor play, thereby encouraging players to enjoy being active and promoting a healthy lifestyle.

The invention is based upon re-creating traditional indoor games in a new format suitable for outdoor play. Typically, but not exclusively, the invention involves re-creating table games into wall versions of the games with new game rules.

In particular, the invention resides in games apparatus comprising a playing wall including a plurality of targets, each target having a particular value associated therewith. Balls or the like are aimed at the playing wall with scoring dependent upon the value of the target that is struck. Depending on the particular game selected, the balls may be kicked towards the playing wall or thrown, thus helping improve the players aim and co-ordination skills. For younger players, bean bags or similar objects may be used instead of balls. If a target is struck, there will be a value associated with that target and the player may also be required to update a score accordingly.

The playing wall, also referred to as a kick wall, can be provided as a freestanding wall or panel, preferably supported by posts or the like or may be incorporated into a fenced area traditionally known as a multi-use games area or ball court. While not being limited by size, a typical playing wall according to the invention may have a surface area similar to that of a conventional football goalmouth, for example about 7 m wide×2.5 m high, though smaller and larger dimensions are envisaged and can be selected according to the game and/or the location where the apparatus is to be used.

When of a size comparable to a conventional goal, players gain useful training in football skills as they aim for particular targets in the "goalmouth" that is the playing wall.

Since the playing walls are primarily for use in public spaces, it is desirable that they are durable and vandal proof. For example, the playing surface may be made of high density polyethylene (HDPE), which material has a degree of flexibility to avoid cracking if exposed to high temperatures, is UV stable and generally weather resistant, and by virtue of a waxy surface can be readily cleaned of graffiti.

The playing wall may be constructed from a flat vertical board, such as of HDPE, supported on either side by steel posts and a back frame. Any supporting frame for the playing wall may suitably made of galvanised and powder-coated mild steel and allows for expansion and contraction of the HDPE panels. The playing wall could equally be constructed from alternative materials such as plywood or steel sheet.

The targets on the playing wall may be integral with the wall or otherwise fixed thereto, but may alternatively be in the form of rotatable elements, such as disks, whereby rotation is effected when the particular target is struck. Preferably the targets are comprised of metal discs that are fixed, ideally bonded, flush with the playing surface. For example, the discs may comprise 3 mm aluminium bonded to the playing wall with an adhesive such as Resibond™. When the targets are of a different material to the surface of playing wall, the noise generated when the target is struck is different to that when the surrounding wall is struck thereby providing an audible signal of a successful strike. A yet further alternative is to provide each target with a touch sensitive element, such as one that emits a sound or lights up when it is contacted by the ball or the like. In this way, a player may more easily identify when the ball or the like has successfully hit a target. Each target may be associated with a different coloured light or different sound in order to provide easier identification of the target struck. One or more of the targets may comprise apertures through the playing wall, such that the object being thrown or kicked towards the wall passes through the aperture on a successful strike.

The values attributed to each target may be reflected on the target itself, for example, by way of a number, a colour, a shape or any combination thereof Typically, a higher value target will occupy a smaller area of the playing wall than a relatively lower value target, thereby reflecting the greater skill required to hit it. Alternatively, or in addition thereto, a higher value target may be located in a position on the playing wall where it is potentially more difficult to hit.

The playing wall may be provided with a different arrangement of targets on each of its front and back faces, thereby providing an opportunity for players to choose which one of two games to play. Such an arrangement also makes it possible for two games to be played simultaneously, one set of players aiming towards a front face of the playing wall and another set of players aiming towards its rear face.

The playing wall can be routered to detail certain elements of the specific game it involves such as the associated rules, and/or contact details relating to a competitive league for the game.

In order to help avoid misdirected balls or the like travelling too far away, when no contact is made with the playing wall, or to protect spectators from stray balls, etc. it is preferred to provide side walls, alternatively referred to as rebound panels, at one and preferably both sides of the playing wall. Such side walls may be in the form of wire fencing or the like, to provide an open aspect for spectators and also to help reduce the weight of the apparatus, especially where the apparatus is intended to be mobile. Preferably, each side wall is adjoined to the vertical sides of the playing wall and hinged or otherwise affixed thereto to permit the side walls to be folded against the playing wall surface when not in use or to permit transport.

In use, the or each side wall may be aligned with the playing wall, but is preferably angled with respect thereto thus allowing the playing wall to be at least partially enclosed by the side walls. In this way, balls hit towards the playing wall are likely to rebound towards the area where the ball is aimed from, helping reduce the time between consecutive shots being taken. Moreover, such an angled arrangement provides a more sturdy footprint for the apparatus.

While the playing wall comprises the main element of the game apparatus and each game may be played with a player aiming a ball at the wall from a fixed position relative thereto, to encourage the players skills and to add to the fun of the game, the games apparatus preferably further comprises a series of ground markers for marking different starting positions for the ball and/or player when aiming a shot at the playing wall. Preferably the ground markers are arranged on the ground at varying distances and/or varying angles in relation to the playing wall. In this way, even the lower value or "easier" targets on the playing wall may become more difficult to hit, if a shot has to be taken from an awkward angle or distance from the wall.

The ground markers may be permanently affixed to particular ground positions, or may be relocatable, the latter being especially useful where the games apparatus is intended to be mobile. Having ground markers that can be moved enables infinite variations in the game, allowing varying degrees of difficulty to hone the skills of the players.

Preferably, the ground markers are in the form of disks, like moveable "penalty spots", that may be laid upon the ground at the desired positions. The ground markers may include an indentation or the like to enable a ball to rest over the indentation and remain still while a player prepares to play his shot.

To enable the game to be played on an uneven playing surface, the ground markers may be flexible to allow good contact with the underlying surface. The ground markers may, for example, comprise a flexible material, preferably including an adhesive layer and release layer, the latter being removable to permit adhesion of the markers to the playing surface at a selected position.

In another variation, the ground markers may be applied to the ground, such as by spraying or painting, in the manner of a road marking. Alternatively, the ground markers may be provided on a flexible sheet or ground covering that can be laid out in front of the playing wall. In this way, different sheets having different arrangements of ground markers thereon may be used and selected according to the ability and/or age ranges of the players.

Each ground marker preferably has a number, letter, colour, symbol or combination thereof displayed thereon that is different from the other markers; in other words each ground marker is uniquely identified.

In order to enhance the features of the game, the games apparatus preferably further comprises a selector device for randomly selecting a particular ground marker to be used for the next shot or series of shots at the playing wall. A preferred selector device may comprise a wheel marked with numbers, letters, colours, symbols or the like that correspond with numbers, colours, etc on the ground markers, and an arrow or similar such marker. The wheel and/or the arrow can be spun and the position of the arrow in relation to the number/colour, etc on the wheel when it comes to rest determines which ground marker the next shot or shots are to be taken from.

Of course, it will be appreciated that the selector device may comprise an electronic random number/symbol generator and a digital display. On the other hand, in a simpler form, for example if only six or fewer ground markers are used, the selector device may comprise a die. However, it is advantageous that the selector device be readily visible to all participants and even spectators if present, so a freestanding device, able to be positioned close to the playing wall or close to where the participants line up ready to take their shots, is preferred.

Since each of the games to be played using the playing wall according to the invention involve a scoring system, the games apparatus preferably further comprises a scoring device for displaying the score of one or more players, or teams. To encourage participants to sharpen up their mental arithmetic skills, it is preferred that the scoring device comprise a manual scoring device, as opposed to an automatic or electronic scoring device. Again, a free-standing scoreboard is a preferred option. In one arrangement, the selector device and scoring device are provided in combination, for example on a single board or panel.

The scoring device may comprise board provided with a plurality of elongate slits therethrough and a numerical scale to indicate the number of points scored is marked on the board adjacent each slit. Each slit is associated with a slidable counter, or slider, that can be advanced along the slit according to the scores achieved by the players. For example, a scoring device may comprise four slits and sliders for displaying the scores of up to four players or teams of players. Preferably each slider is held against the front face of the board by means of a bolt that passes through its associated slit and is secured via a nut, typically an anti-vandal nut, on the rear of the scoreboard.

For ease of reference, the scoring device preferably also displays the rules of the game to which it relates. The scoring device is preferably adapted according the game it is associated with, for example, in relation to a snooker-based game, the scoring device may include an additional slit and counter for displaying the number of red "balls" that remain in play. The number of reds "potted", such as may be achieved by means of a successful strike against a red target on the playing wall, is subtracted from the "remaining reds" counter, so that players know at any time during the game the possible scores that are still achievable.

To enable the games apparatus to be set up anywhere, one or more of the game components, for example, the playing wall, the random selector device and/or the scoreboard, may be mounted on wheels thereby allowing easy relocation of the apparatus to a chosen playing area or to a storage area when not in use. Preferably, the wheels are lockable to prevent the components from moving when in use, or to discourage theft of the equipment.

A wide variety of different games are envisaged using the games apparatus according to the invention, particularly table games that are transformed into vertical versions of the games, with new game rules. So, for example, instead of scoring by potting coloured snooker or pool balls into pockets on a snooker/pool table using a cue, by means of the present invention a player scores by striking a target, similarly marked such as by colour and/or number to the snooker/pool balls, provided on a substantially vertical playing wall.

From another aspect, the present invention resides in a games apparatus and associated method of playing a game, comprising a playing wall having a series of targets each target corresponding to a ball of a snooker or pool game and having a value corresponding to the snooker or pool ball, wherein a player aims an object, such as a ball or the like, towards the playing wall and when a target is hit, the player scores points according to the value of the target. Like snooker and pool, the targets are desirably struck in the order required in the conventional table game, and the scoring follows that of the conventional game also.

In such a game, the targets may be presented as balls, such as but not limited to circular markings or discs, for example arranged on the playing wall in the same configuration as would be used to commence a snooker or pool game. In a snooker based wall game, the red balls may be represented as a triangular target to reflect the triangular arrangement of red balls at the commencement of the conventional table version of snooker. The "red balls" target is also preferably larger as compared to the other targets representing the other coloured balls. The six colour balls of a conventional snooker game, namely yellow, green, brown, blue, pink and black, are also represented as targets in a snooker-based wall game.

Alternatively, whilst sharing the same values as the ball-shaped targets described above, the targets may be in the form of a series of coloured strips or bands representing cross-bars, disposed horizontally at intervals up the playing wall. The coloured bands may project out of the plane of the playing wall, for example to resemble to profile of a cross-bar of a conventional goal. Each strip or cross-bar may have the colour of a snooker ball and the same value of the snooker ball associated with it. Preferably the lowest cross-bar may correspond to the red ball and have an associated low point value, whereas a black cross-bar at the uppermost position attracts the highest value, reflecting the greater skill required to hit that as the target. In such an arrangement, players will be not only hone their football shooting skills but are also challenged to remember the values associated with each crossbar and keep their score accordingly.

Typically, the uppermost crossbar on the playing wall will be at a similar height to a conventional soccer crossbar, though the size of the playing wall can be varied to suit the particular age-range of the players. Again, ground markers are preferably included, ideally in conjunction with a selector device, so that players are required to shoot from different positions determined by the ground markers relative to the playing wall.

Whatever games are involved on the playing wall, they are all easily accessible and playable in all weather conditions. Thus the apparatus is designed to promote a new type of outdoor physical activity and gaming that clearly encourage well-being in children and adults alike through graduated challenges which give educational and health related benefits, and through numeracy and logical thinking, competitive play and building self esteem.

The games apparatus according to the invention is particularly beneficial for use in a schools environment but may equally extend to use in open parks, youth clubs and private gardens. While primarily intended for outdoor use, it will be appreciated that the apparatus is also suitable for indoor use, such as in sports halls, leisure complexes, and indeed any other sizeable indoor arena. Moreover, when the games apparatus is constructed to allow mobility, it can be used outdoors during fine weather and brought indoors, such as into school halls or gyms, during inclement weather.

From another aspect, the invention also resides in a method of playing a ball game comprising randomly selecting a shooting position from a plurality of shooting positions marked on the ground, aiming a ball by kicking or throwing from said selected shooting position at a predetermined target selected from a plurality of targets having each having a value attributed thereto, said targets being carried on a playing wall in front of but spaced apart from said shooting positions and scoring points to the value of the predetermined target if the target is struck by the ball.

Preferably the shooting position is selected using a random selector device displaying a plurality of alternative numbers, symbols or the like corresponding to numbers, symbols or the like displayed on a plurality of ground markers which denote the shooting positions.

In a preferred embodiment, the game may comprise an electronic version of said game, for example, for playing on a portable electronic device, such as a smartphone, games console, television, personal computer or the like. As one of the benefits of the game is to encourage physical activity, the game is ideally suited for a games console with remote controller for operating the ground marker selector and for aiming a virtual ball at the target wall displayed on a screen.

The invention will now be described by way of example, with reference to the accompanying drawings, in which.

Figure 1:
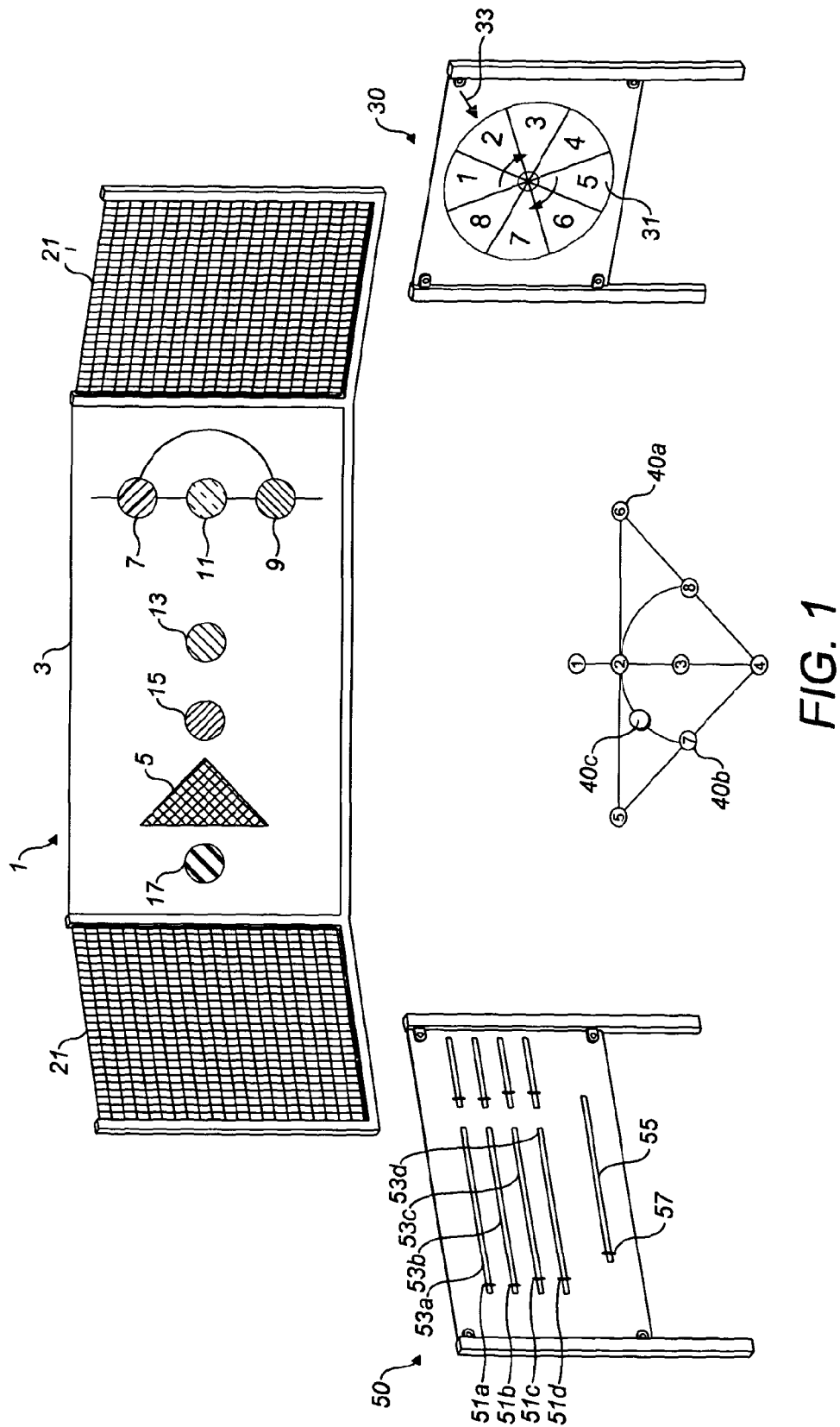
FIG. 1 shows a "Street Snooker"™ games apparatus in accordance with a first embodiment of the invention.

Referring to FIG. 1, there is shown a playing wall 1, selector device 30 and scoreboard 50 for playing a modified snooker game, "Street Snooker"™, in accordance with a first aspect of the invention.

Playing wall 1 comprises a vertical playing surface 3 provided with a triangular target 5, and circular targets 7, 9, 11, 13, 15, 17 each of a different colour and attracting a different value. The triangular target is red, and the circular targets are yellow 7, green 9, brown 11, blue 13, pink 15 and black 17. The targets are positioned on the target wall 1 in a similar arrangement to the positions the corresponding coloured balls would occupy at the commencement of a conventional table snooker game.

The playing wall 1 has a wire fence 21, 21' extending from each end, pivotable with respect to the wall, to enable the fence 21, 21' to be folded against the front or rear face of the wall for storage purposes. In an alternative arrangement, the fence 21, 21' may be detachable from the playing wall, and may be dispensed with when the playing wall is installed on or against a perimeter wall or fence. The wire fence acts to return stray balls that are aimed at the playing wall but "miss" back towards the playing area in front of the wall, whilst at the same time allow persons standing behind the fence to have a relatively unobstructed view of the game being played.

A selector device 30 stood near the playing wall 1 includes a wheel 31 spinnable (rotatable) around its central axis. The wheel 31 carries a series of numbers corresponding to numbers displayed on ground markers 40a, 40b, etc. arranged on the ground in front of the playing wall 1. During play, the wheel 31 is spun and the number on the wheel that is aligned with the arrow 33 displayed on the device when the wheel 31 comes to rest determines the corresponding ground marker position from which the next shot is taken.

Ground markers 40a, 40b, etc. for identifying the various positions from which a shot or throw is taken are spaced apart on the ground before the playing wall 1, each carrying a number between 1 and 8 to correspond with the numbers on the wheel 31 of the selector device 30.

A scoring device in the form of a scoreboard 50 is also stood in proximity to the playing wall 1. Sliders 51a, 51b, 51c, 51d held in elongate slits 53a, 53b, 53c, 53d through the scoreboard 50 are advanced along the slits to show the score of each player or team. Each slit has a numerical scale displayed alongside. The scoreboard 50 also includes an additional slit 55 with slider 57 with a numerical scale for counting the number of red balls that are remaining to be potted.

An example of the rules of a snooker-based game, "Street Snooker"™, which may be played with the games apparatus of FIG. 1 follows:

"Street Snooker"™ Rules

Number of players: 2 or more

Object of the Game: To score more points than opponents by kicking (or throwing) a soccer ball (or tennis ball) from designated ground markers 40a, 40b, etc. as determined by the wheel selector 30 to score more points than your opponent.

The game ends when the red triangle 5 has been struck fifteen times (meaning that, like in a game of snooker all the reds have been potted) and the remaining colours have been struck in correct order (yellow, green, brown, blue, pink, black).

In a variant of the game, players can opt for a speed challenge game, where the player who scores most points in a given time (eg: 20 minutes) is the winner.

Scoring (for KICKING game): Points are scored by kicking a football against the coloured target disks. Each coloured disk has a point value. RED (TRIANGLE SHAPE) 5 (1 point), YELLOW 7 (2 points), GREEN 9 (3 points), BROWN 11 (4 points), BLUE 13 (5 points), PINK 15 (6 points), BLACK 17 (7 points).

Scoring (for THROWING game): Points are scored by throwing a tennis ball against coloured target disks. Each coloured disk has a point value. RED (TRIANGLE SHAPE) 5 (1 point), YELLOW 7 (2 points), GREEN 9 (3 points), BROWN 11 (4 points), BLUE 13 (5 points), PINK 15 (6 points), BLACK 17 (7 points).

In one variation of the game, suitable for junior players, the match ends when the red triangle 5 has been struck ten (10) times denoting that the "reds have been potted" and the remaining "colour" targets 7, 9, 11, 13, 15, 17 (which give a total value of 27 points) are not enough for the lesser scoring player to catch up with.

In another variation of the game, the match ends when the red triangle 5 has been struck fifteen (15) times denoting that the "reds have been potted" and the remaining "colours" (which give a total value of 27 points) are not enough for the lesser scoring player to catch up with.

1) Opening shot: Players flip a coin to decide who shoots first. In a match format the players alternate the "break" in subsequent games (otherwise known as "frames").

2) Starting player places ball on ground marker "R SPOT" 40*r* on the ground.

3) Every time a player is aiming for a red target the shot is taken from the "R SPOT" 40*r* marker which is always the starting spot on a new turn.

4) Player 1 strikes the ball and aims for the red triangle 5.

5) If the current player strikes the red triangle 5 on the snooker wall 3, that player's counter (slider) 51*a* is advanced by one point on the scoreboard, and the opposing player spins the spot selector wheel 31 to determine the next ground marker spot for their opponent's next strike.

6) The current player places the ball on the newly designated spot carrying numbers from 1 to 8 and chooses a target to strike next (yellow, green, brown, blue, pink or black).

7) If the current player misses his chosen target after three attempts, then the opponent takes his turn.

8) Whilst the current player is scoring consecutive points, the opponent may call out the score so that all players and spectators present can hear how high the break is. The current player's counter is advanced in accordance with the points value of the targets successfully hit.

9) Each time the current player is playing for a colour (that is a colour other than red), it must be taken from the designated numbered spot marker as selected by the random spot selector wheel 31.

10) Each player gets THREE attempts at each shot from the designated spot marker. If the player strikes the target, he is allowed a fresh three attempts at the following selected shot.

11) Each time the red triangle target 5 is struck or "potted" the "REMAINING REDS" slider on the scoreboard 50 is reduced by one point until 10 (or 15) becomes 0 and aiming for the red triangle 5 is no longer allowed.

12) Once a player has finished his turn, his "break" is completed on the scoreboard 50 and the opponent takes his turn.

13) A legally struck target entitles the player to continue at the "table" (playing wall) until he fails to strike the selected target.

14) As long as there are "reds" remaining on the table, the incoming player always commences his turn by aiming at the red triangle 5 as his object target.

15) After a player has hit the red triangle 5 initially, his next object is a colour target 7, 9, 11, 13, 15, 17 and as long as the red triangle 5 has not already been struck 10 (or 15) times he must alternate his play between the red triangle and the colours. When selecting a colour he may play a coloured ball of his choice (yellow 7, green 9, brown 11, blue 13, pink 15, black 17).

16) Whilst reds (triangle shots) remain on the table and a colour is his object, the player must designate prior to striking which colour target is his object (that specific colour is then his "ball on"). The player cannot change his choice of colour target once it has been selected.

17) If the player misses his elected colour target and accidentally strikes a different colour target there is no foul.

18) When no "reds" remain on the table, the player must aim for the colour targets in ascending numerical order, yellow 7 (2 points), green 9 (3 points), brown 11 (4 points), blue 13 (5 points), pink 15 (6 points), black 17 (7 points).

19) 4 points may be awarded to the opposing player if (i) a player places and shoots the ball from an incorrect spot and/or (ii) if a player shoots for a colour target without first calling out his selection.

If the players' scores are equal after the final black target has been struck, the players may play a penalty shoot out, for example, in a best of five shots match, for example with the following rules:

a) Ball to be placed 7 m away from the playing wall 1 and in line with the blue target 13.

b) Each player takes FIVE shots and must strike blue target 13 as many times as possible.

c) Player that strikes the blue target 13 most times out of five attempts wins the game.

d) If both players strike the blue target 13 the same amount of times, the shootout game is repeated until a winner is decided.

Figure 2:
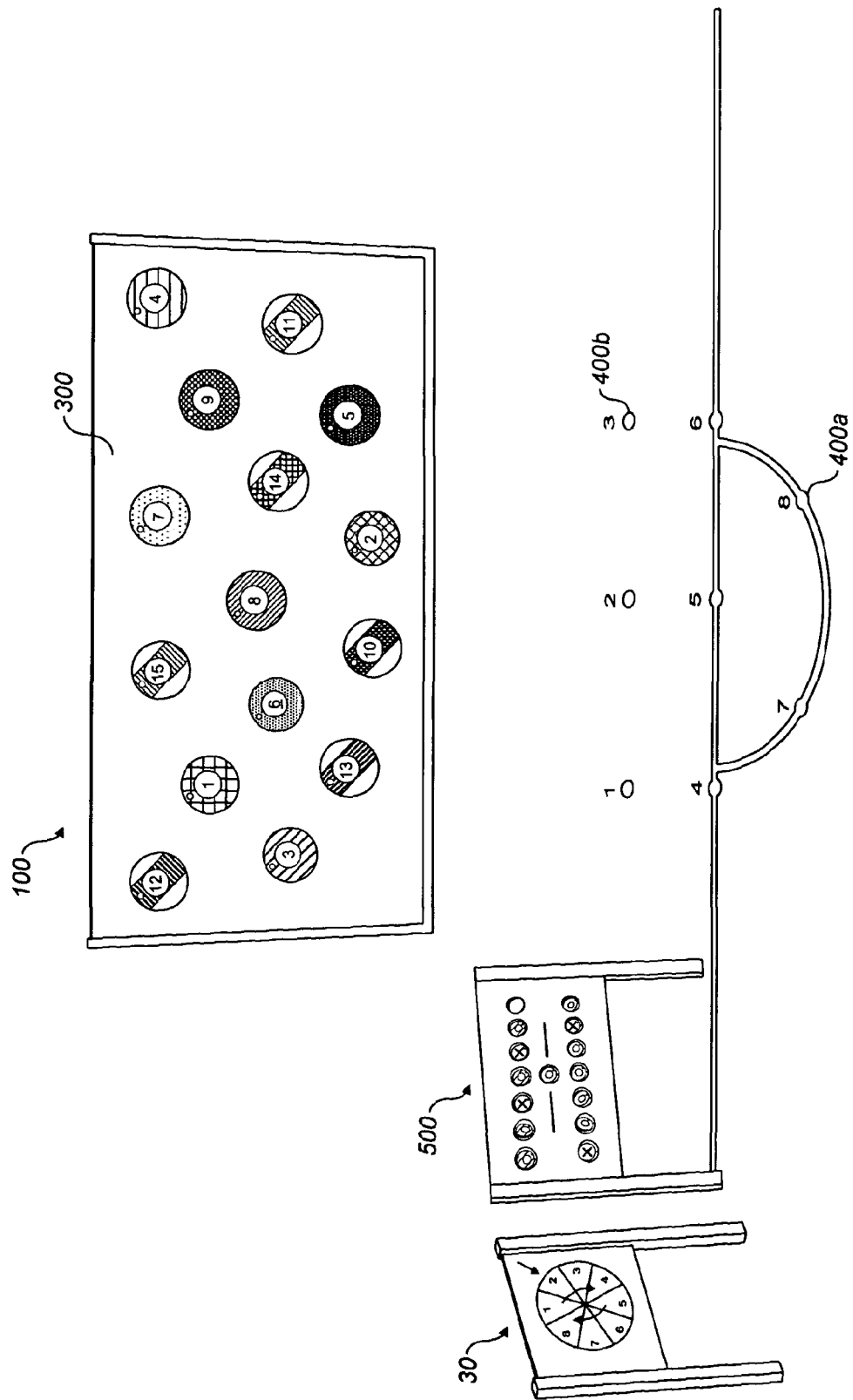
FIG. 2 shows a "Street Pool"™ games apparatus in accordance with a second embodiment of the invention.
Figure 3:
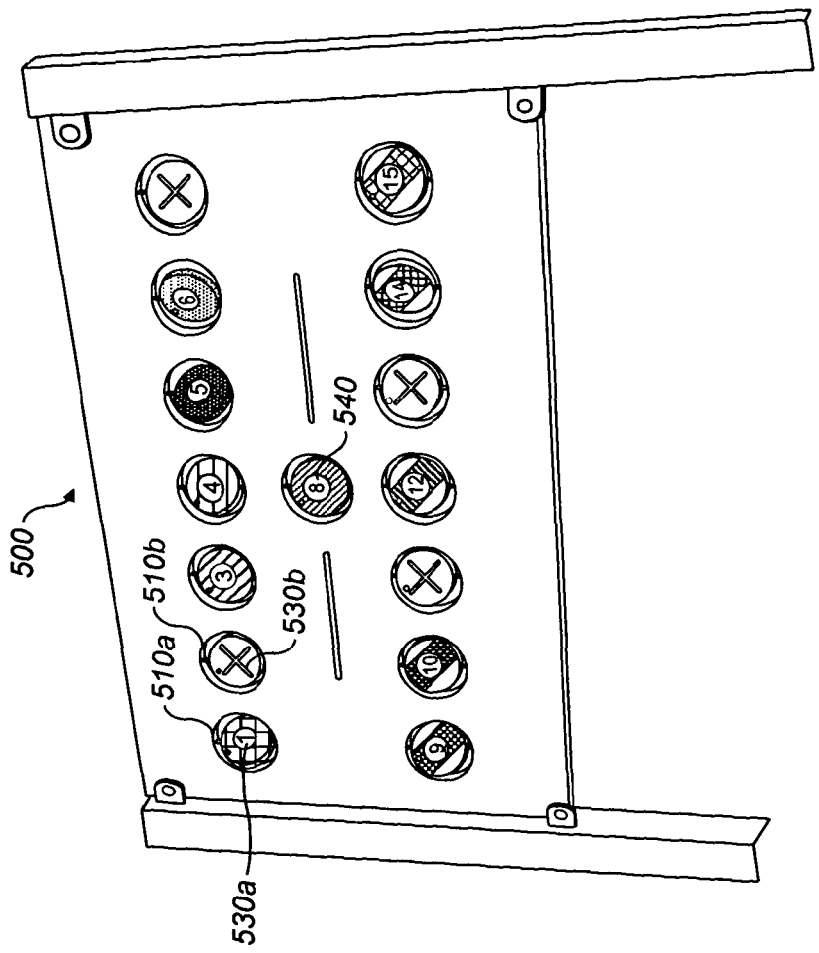
FIG. 3 is an enlarged view of an alternative scoreboard and a selector board of the games apparatus of FIG. 2.
Figure 3:
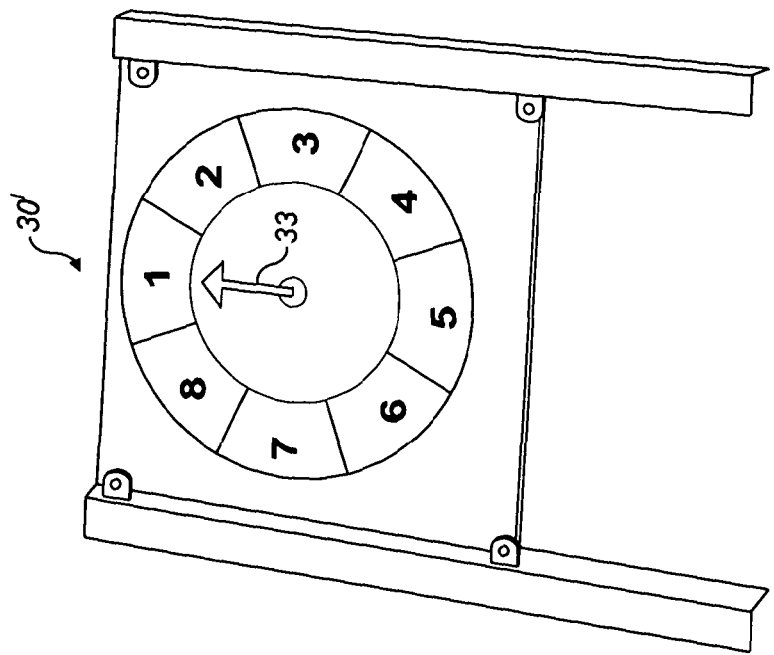

Referring now to FIGS. 2 and 3, these show the games apparatus for playing a modified pool game, "Street Pool"™, which may alternatively be known as "American Street Pool"™. In particular, there is shown a playing wall 100, ground markers 400*a*, 400*b*, etc., a selector device 30 and a scoreboard 500.

The playing wall 100 as shown in FIG. 2 comprises a vertical playing surface 300 provided with "balls" in the form of fifteen coloured targets, each target having a different colour and/or attracting a different value. Specifically, targets having values between 1 and 8 are represented as solid colour targets and targets having values between 9 and 15 are represented by striped colour targets.

In front of the playing wall 100, a series of ground markers 400*a*, 400*b*, etc. are laid or marked upon the ground, each marker having a number corresponding to a number on the selector device 30, 30'. The selector device 30 of FIG. 2 is essentially the same as that used for the "Street Snooker" game of FIG. 1, whereas the selector device 30' of FIG. 3 is a modified version. In particular, the selector device 30' has an arrow 33' that is rotatable about a central axis for determining which ground marker the ball has to be placed upon (or stood on if in a throwing version of the game) to take the next shot.

The scoring system and hence the scoreboard 500 shown in FIGS. 2 and 3 reflects the rules of the table game known as 8-ball pool. The scoreboard 500 has two rows of seven apertures 510a, 510b, etc., and in each aperture a rotatable disc 530a, 530b, etc. is held. The front face of each disc displays the number and colour marking (solid or stripe) of a corresponding target on the playing wall. The top row has discs marked consecutively with the numbers 1 to 7, the bottom row has discs marked consecutively with the number 9 to 15, and between the top and bottom row is a single disc 540, typically coloured black, with the value of 8. The discs can be rotated by 180° to display their rear face, marked with a "X" or other such symbol, to denote when the corresponding target on the playing wall has been struck successfully in accordance with the associated rules of the game and is effectively out of play.

An example of the rules of a pool-based game involving the apparatus of FIGS. 2 and 3 is as follows:

"Street Pool™" Rules

Number of players: 2 or more

Object of the Game: To strike the player's selected targets (SPOTS OR STRIPES) on the playing wall 100 in ascending numerical order from 1 up to 7 (or from 9 up to 15) and then strike the 8-ball target 540 before your opponent.

How? By kicking (or throwing) a soccer ball (or tennis ball) from designated ground markers 400a, 400b, etc. as determined by the wheel selector 30'.

The game ends when the 8-ball target 540 has been struck after the player has already struck their targets in numerical order.

1) Opening shot: Players flip a coin to decide who will be spots and who will be stripes. The winner (player 1) of the coin flip shoots first. In a match format the players alternate the "break" in subsequent games (otherwise known as "frames").

2) The opponent (player 2) stands at the selector device 30, 30' and spins the wheel selector 31 or arrow 33' to determine which designated ground marker spot 400a, 400b, etc. the current player (player 1) must shoot from.

3) Player 1 places the ball on the selected ground marker, shoots and aims for target ball number 1 (e.g. Stripe number 1).

4) If player 1 manages to strike target ball number 1 within three shots, they can move on to ball number 2, then 3, then 4, then 5, then 6, then 7 and finally the 8 BALL to win the game.

5) Each time the current player is playing for a colour, it MUST be taken from the designated numbered spot as selected by the random spot selector wheel.

6) Each player gets THREE attempts at each shot from the designated ground marker spot. If the player strikes the target, he is allowed a fresh three attempts at the next target.

7) Once player 1 has finished his turn by missing the selected target three times, the balls they have "potted" are marked on the scoreboard 500 and player two takes his turn.

8) A legally struck disk entitles the player to continue at the "table" (playing wall) until he fails to strike the selected disk.

9) If the player misses his elected colour and accidentally strikes a different colour there is NO foul.

10) Fouls: If a player places and shoots the ball from an incorrect spot (i.e. not the spot determined by the selector device), his opponent is given a free shot at the 8-BALL to win the game outright. The ball is placed on the 8 ground marker spot and the opponent has TWO attempts to strike the 8-BALL. If the target is struck successfully the player wins the game outright.

Figure 4:
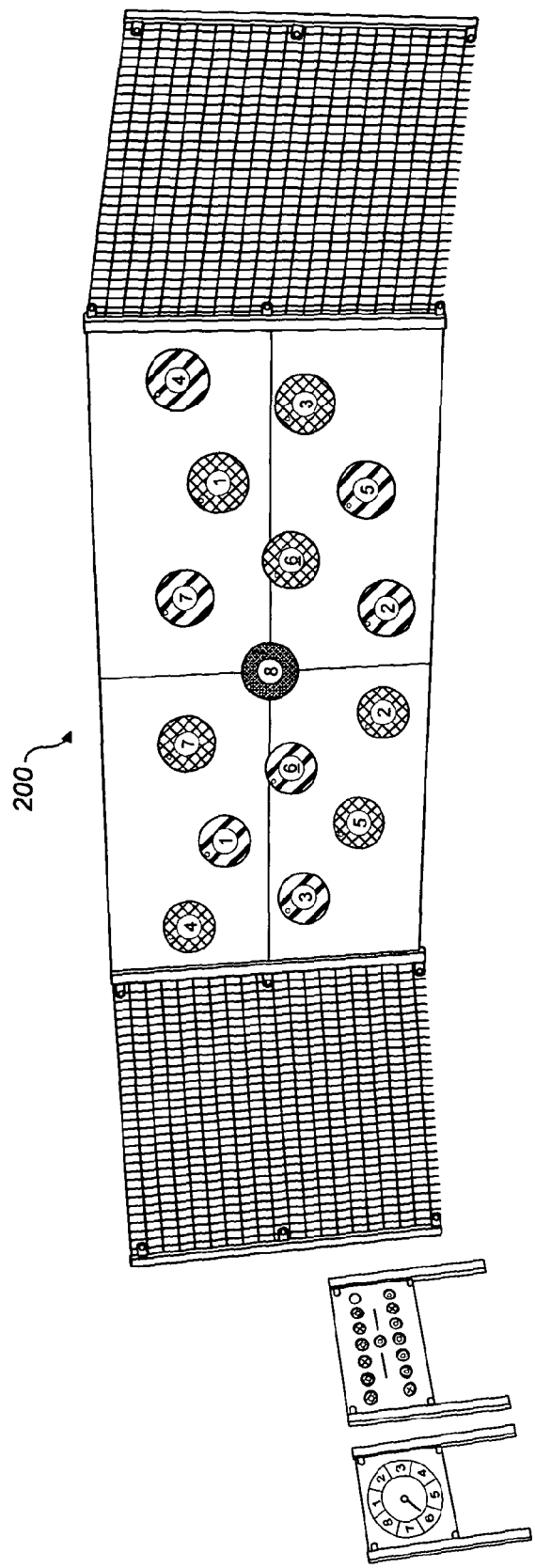
FIG. 4 shows an alternative "Street Pool"™ games apparatus in accordance with a third embodiment of the invention.

Referring now to FIG. 4, this shows games apparatus comprising a playing wall 200, selector device and scoreboard for playing a modified pool game, "Eight Ball Street Pool"™. This game may alternatively be known as "English Street Pool"™.

In this game, the rules are modified so that a player flips a coin to choose his target colour, either yellows (balls numbered 1 to 7) or reds (balls numbered 9 to 15), or black (the 8-ball). The selector arrow 33 is spun to designate a ground marker cueing spot (not shown) from where the next shot must be taken and the balls are targeted in numerical order, as in American Street Pool game described hereinbefore. The first player to hit his coloured targets in numerical order, followed by the black target, is the winner.

Figure 5:
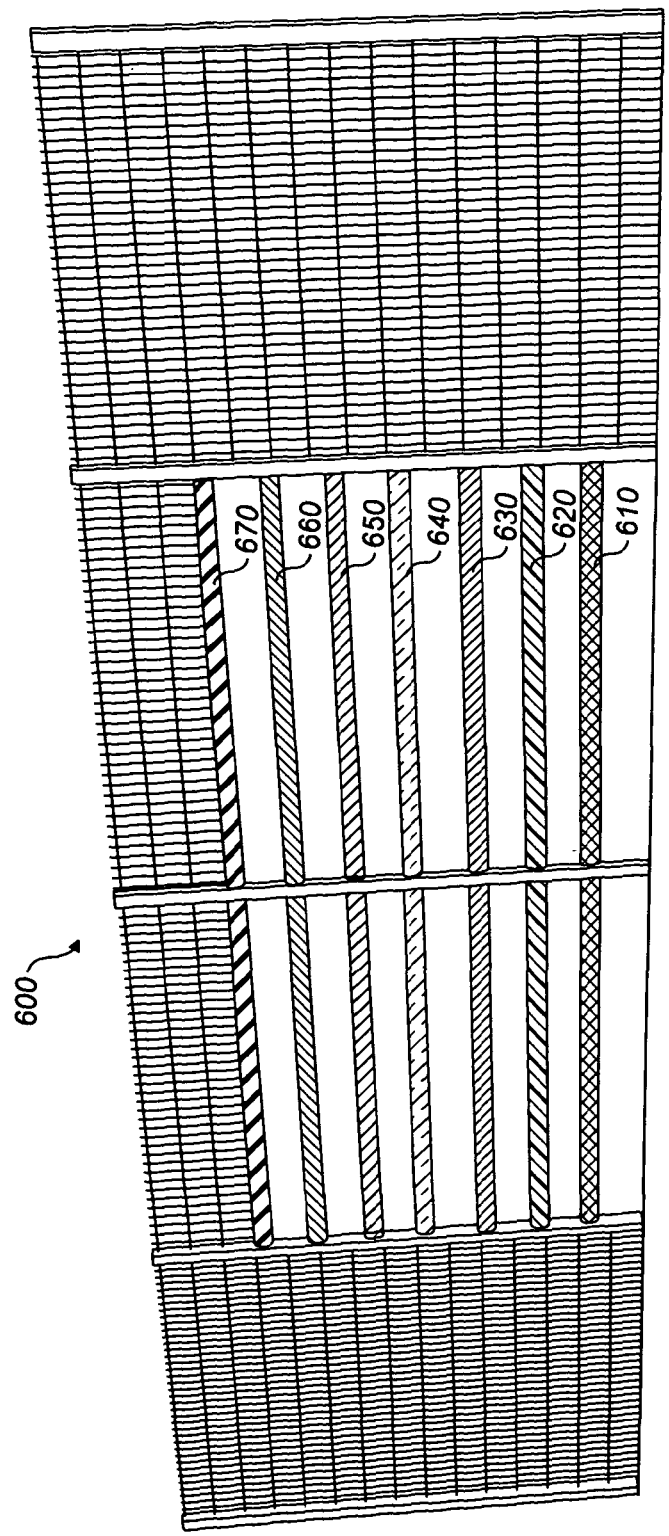
FIG. 5 shows a "Crossbar King"™ games apparatus in accordance with a fourth embodiment of the invention.

FIG. 5 illustrates yet another games apparatus according to a further embodiment of the invention. Specifically, it shows a playing wall 600 incorporating seven crossbars, each colour coded to be the same colour as a snooker ball, starting with a red crossbar 610 at the bottom, followed by a yellow crossbar 620 which is 300 mm above, followed by a green crossbar 630, brown 640, blue 650, pink 660, black 670, all at 300 mm intervals. The top crossbar 670 is at a height of 2400 mm, which is the same height as an adult sized soccer goal.

The aim of the game is to strike the top crossbar 670 for maximum points and to use the lower crossbars for a graduated challenge or for players to use in a similar point scoring game to snooker. For example, a player must first aim for the red cross-bar 610 and then pick a coloured bar 620, 630, 640, 650, 660, 670. Like "Street Pool"™, the crossbar game—"Crossbar King"™—is a further example of a game where the rules of snooker are translated from a table-based game to be played against a vertical playing wall. The apparatus for this game may similarly include ground markers and a selector device and be played in accordance with the rules described hereinbefore in relation to the "Street Snooker" game.

Figure 6:
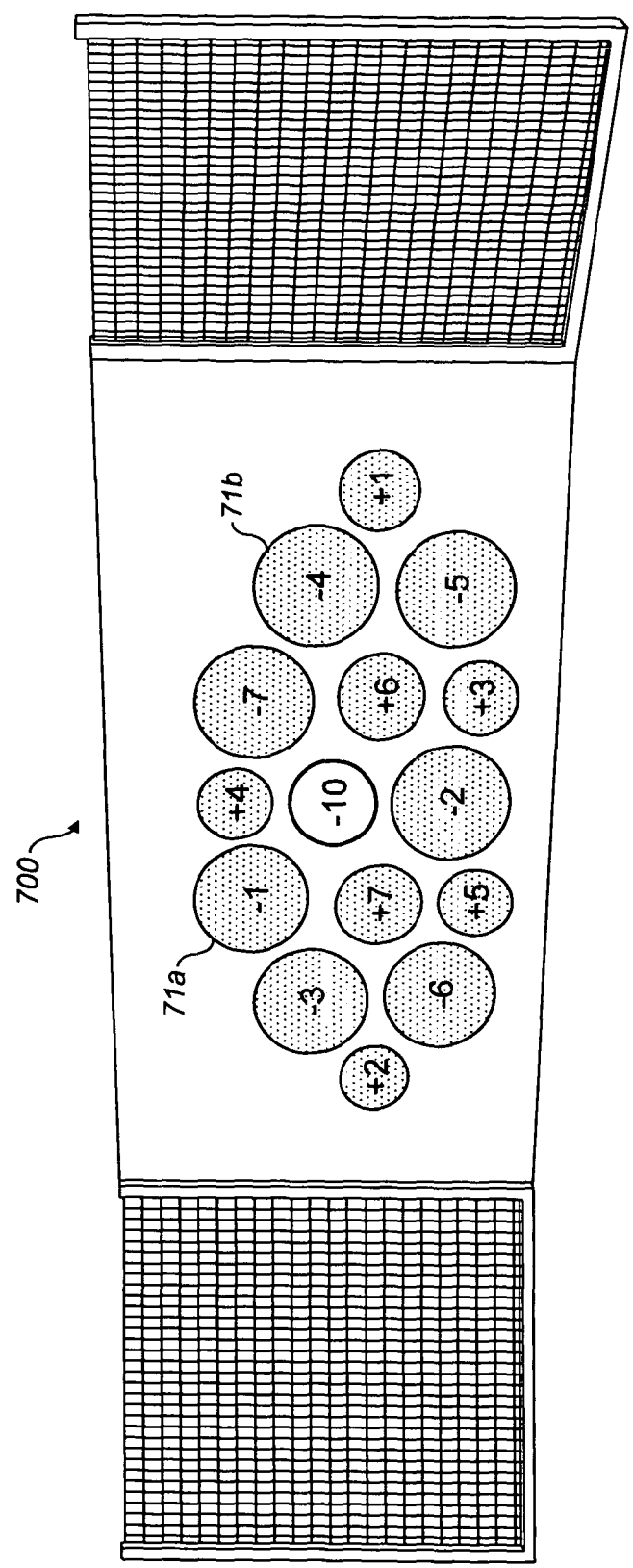
FIG. 6 shows a "First to Zero"™ games apparatus in accordance with a fifth embodiment of the invention.

FIG. 6 shows a "First to Zero"™ games apparatus. In this embodiment, the playing wall 700 carries fifteen target disks 71a, 71b, etc. all in different sizes, each having a number and minus or plus signs thereon.

In this game, the players start with 50 points and aim for the targets with a view to getting down to exactly zero. If the player strikes a plus number, then their score goes up. If the player goes below zero, they must then aim for a plus number to get back to zero. The first player to get to exactly zero is the winner.

Again, whilst not shown in FIG. 6, the "First to Zero"™ game may include ground markers that are selected randomly by a spot selector wheel/device to determine the shooting position that a player must start his shot from.

Figure 7:
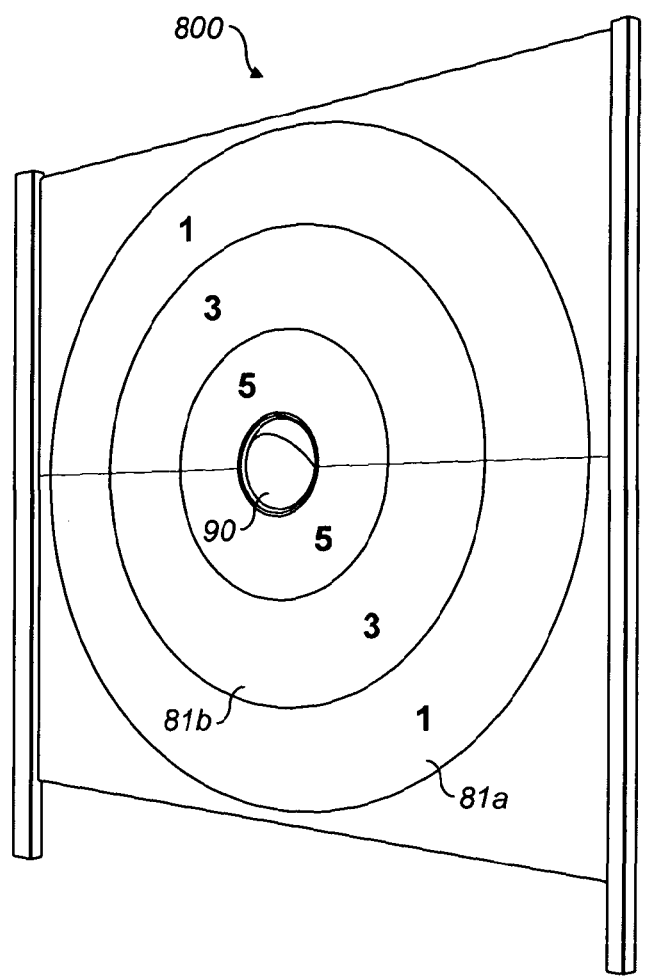
FIG. 7 shows a "Street Darts"™ games apparatus in accordance with a sixth embodiment of the invention.

Finally, FIG. 7 shows a "Street Darts"™ games apparatus. In this embodiment, the playing wall 800 is marked with targets in the form of concentric rings 81a, 81b, etc., and the game is played in a similar fashion to a conventional dart game, but by throwing either a tennis ball or bean bag, or kicking a ball towards the wall, rather than throwing a dart.

The aim of the "Street Darts"™ game is to start on 50 points and be the first to get down to zero. The centre target, corresponding to a "bull's-eye" in a conventional darts game, comprises an aperture 90 through the playing wall 800 and attracts a top score of 10 points. A receptacle, such as a bowl, net or the like, (for example, a transparent polycarbonate bowl made from Lexan Margard™ having good impact resistance), may be provided to the rear of the playing wall to catch any balls, etc that pass through the centre target 90.

Since in this game it may be more difficult for a player to determine which part of the playing wall has been struck, the target areas 1 to 5 may be touch sensitive, for example comprising electronic sensors and speakers that call out the number/value of the area that the ball or the like has struck.

The foregoing embodiments of the invention are provided for illustrative purposes and are not intended to limit the scope of the invention. Variations and modifications are apparent from a reading of the preceding description and are included within the scope of the invention. The invention is intended to be limited only by the scope of the accompanying claims.

What is claimed is:

1. A ball game apparatus for use by at least two players, the ball game apparatus comprising:
    a playing wall;
    a plurality of targets arranged across at least one face of said playing wall, each target having a particular value associated therewith; and
    a series of ground markers that mark a series of alternative starting positions for the ball, the player, or both when aiming a shot at the playing wall,
    wherein:
        during use of the ball game apparatus in a game a player aims a ball at the playing wall and scores points to the particular value associated with a target that is struck; and
        each ground marker carries an insignia corresponding to position indicators on a random position selector device such that the random selector device randomly selects a particular ground marker from which a player is to play a next shot.

2. The ball game apparatus of claim 1, wherein the playing wall is free-standing for use in a plurality of locations.

3. The ball game apparatus of claim 1, further comprising side walls extending from either side of the playing wall.

4. The ball game apparatus of claim 3, wherein the side walls are wire fence panels.

5. The ball game apparatus of claim 3, wherein the side walls are hingedly attached to the playing wall.

6. The ball game apparatus of claim 1, wherein:
    the targets on the playing wall correspond in value to snooker balls or pool balls used in a conventional table snooker or table pool game; and
    the targets are color-coded to correspond with the snooker balls or pool balls.

7. The ball game apparatus of claim 1, wherein the targets comprise disks rotatable about an axis in a plane of the playing wall such that a disk is caused to rotate when the disk is struck by a ball.

8. The ball game apparatus according to claim 1, wherein each target includes a touch sensitive sound emitting device, a light emitting device, or both, such that when a target is struck the touch sensitive sound emitting device emits a sound, a light, or both to indicate a successful strike.

9. The ball game apparatus of claim 1, further comprising a selector device that randomly selects a position from where the player plays a next shot toward the playing wall.

10. The ball game apparatus of claim 9, wherein:
    the selector device comprises a wheel marked with position indicators and an arrow, and
    at least one of the wheel and the arrow is spinnable about a central axis to generate a playing position according to an alignment of the arrow with the position indicators after spinning.

11. The ball game apparatus of claim 9, wherein the playing wall and the selector device are free-standing and mounted on wheels.

12. The ball game apparatus of claim 1, wherein the ground markers comprise a series of disks for laying on the ground, each disk carrying a unique insignia that differentiates one ground marker from other ground markers.

13. The ball game apparatus of claim 1, further comprising a scoring device that displays a current score of each player or team of players throughout the game.

14. A ball game apparatus for use by at least two players, the ball game apparatus comprising:
    a playing wall; and
    a plurality of targets arranged across at least one face of said playing wall, each target having a particular value associated therewith;
    wherein:
        during use of the ball game apparatus in a game a player aims a ball at the playing wall and scores points to the particular value associated with a target that is struck; and
        the playing wall comprises different arrangement of targets on both a front face and a rear face of the playing wall, thereby providing an opportunity for players to choose between two different games to play.

* * * * *